March 23, 1937.  A. W. HILTON  2,074,910
SPRING CONTROLLED FEED PAWL
Filed Oct. 19, 1936
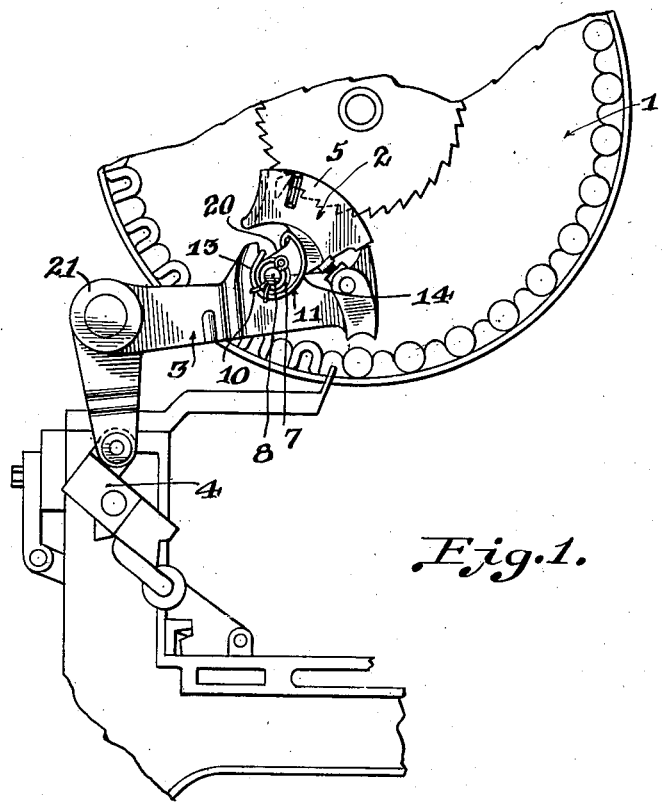
Fig.1.
Fig.2.
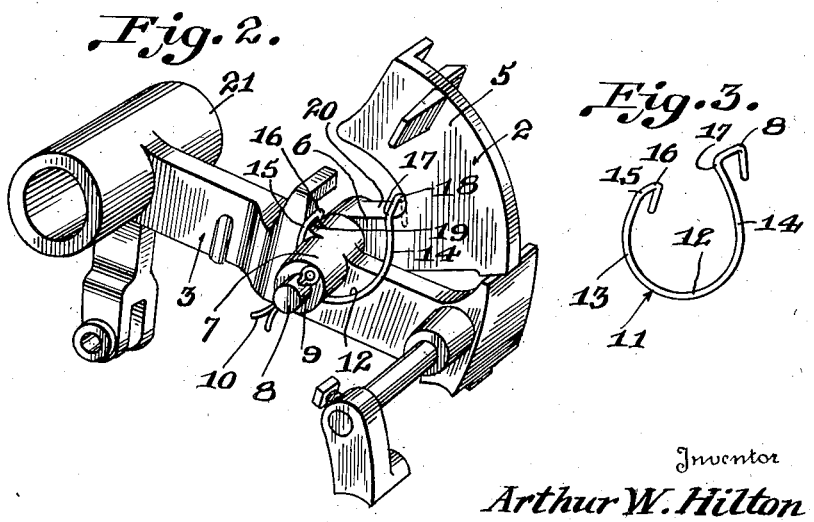
Fig.3.
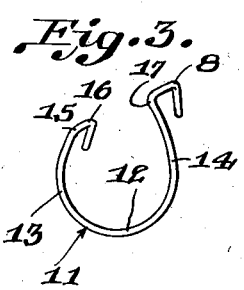
Inventor
Arthur W. Hilton
By Kimmel & Crowell
Attorneys Patented Mar. 23, 1937

2,074,910

UNITED STATES PATENT OFFICE 2,074,910

SPRING CONTROLLED FEED PAWL

Arthur W. Hilton, Marion, N. C.

Application October 19, 1936, Serial No. 106,450

2 Claims. (Cl. 139—250)

This invention relates to an improvement in spring controlled feed pawls for use in connection with looms, more particularly a loom of the "Draper" type.

As is well known, spring controlled feed pawls employed in looms, especially those of the "Draper" type generally include a coiled controlling spring arranged within a cap. The latter is fixed to, bodily moves with and encompasses the outer end of pivot or pivot shaft of the pawl. The cap also encompasses a bearing for said shaft. The bearing forms a part of an oscillatory carrier for the pawl. The spring for the pawl encompasses said bearing. The spring has one end anchored in an opening in the bearing and its other end anchored in an opening formed in the body of the cap. The pawl is of substantially angle shaped contour having the inner end of one of its legs mounted on and fixed to one end of the shaft. The means which fixes the cap to the pivot shaft extends through the cap and other end of the shaft and coacts with the inner end of said leg to arrest the lengthwise shifting of the pivot shaft relative to said bearing. The form of controlling spring employed requires it to be great in length due to its coiled construction and in connection with the cap makes the arrangement an expensive one. It is well known that a controlling spring, for a feed pawl constructed and arranged in the manner as aforesaid is open to the objection principally that it is constantly breaking due to the wear, more particularly, on that end terminal portion of the spring which is anchored in the body of the cap and further, the cap and spring become lost by reason of the wear and tear of the means to provide for the bodily moving of the cap with the pivot shaft.

It is the aim of this invention to overcome the objections as aforesaid with reference to a coiled controlling spring and the cap to which one end of the spring is anchored, and to this end the invention resides in providing, in a manner as hereinafter set forth, a feed pawl controlling spring or element of the non-coiled type free of a cap fixed to the pivot shaft for the pawl, formed of a length of spring wire in the form of an upstanding open loop closed at the bottom and sides and having angle-shaped lateral resilient clamps at the upper end of said sides, of materially less length than the length of spring wire required to provide a controlling spring of the coiled type and having its ends anchored to the pawl and to the carrier for the pawl.

Further objects of the invention are to provide, in a manner as hereinafter set forth, a feed pawl, for use as aforesaid, having a controlling spring of the non-coiled type which is simple in its construction, strong, durable, compact, conveniently installed relative to the body of the pawl and the carrier for the pawl, thoroughly efficient when used, overcoming the employment of an anchoring cap therefor and the anchoring of it to a bearing for the pivot shaft for the pawl, and materially inexpensive to manufacture with relation to the pawl controlling springs of the coiled type now generally used.

To the above ends essentially and to others which may hereinafter appear, the invention consists of such parts and such combination of parts which fall within the scope of the invention as claimed.

In the drawing:—

Figure 1 is a fragmentary view of an intermittently driven element of a loom showing the adaptation therewith of a spring controlled feed pawl, in accordance with this invention, a combined stop and oscillatory carrier for and in which the pawl is pivotally mounted and means for oscillating the carrier, Figure 2 is a perspective view of the carrier having installed therewith the spring controlled feed pawl in accordance with this invention, and Figure 3 is a perspective view of the controlling spring for the pawl.

Referring to the drawing, 1 indicates an intermittently driven element of a loom, 2 a feed pawl for driving element 1, an oscillatory carrier 3 for the pawl 2, and an operating means 4 for the carrier 3. The element 1, carrier 3 and operating means 4 are of known construction. The pawl 2 is of known construction with this exception that its controlling spring is differently arranged and of a different form than that of a controlling spring now generally employed in connection with the pawl.

The pawl 2 is substantially of angle contour and includes a segmental-shaped leg 5 and a leg 6 extending outwardly at right angles with respect to the lower end of leg 5. The legs 4 and 5 are of known form. The carrier 3 includes a transversely extending bearing 7 through which passes the pivot shaft 8 for pawl 2. As is well known, one end of the shaft 8 is fixed in the outer end of the leg 6 of pawl 2 and also that it is of greater length than the length of bearing 7 whereby shaft 8 will project outwardly from the outer end of bearing 7. The foregoing elements or parts are of known form.

The outer end of shaft 8 is formed with a diametrically extending opening 9 through which extends a cotter-pin 10 opposing the outer edge of bearing 7. The inner end of leg 6 in connection with the cotter-pin 10 arrests the lengthwise shifting of the shaft 8 relative to bearing 7 or arrests the shifting of shaft 8 transversely with respect to carrier 3.

The pawl 2 includes a controlling spring or element therefor which is indicated generally at 11. The spring 11 is constructed from a length of spring wire of a desired gauge and bent to provide an open top loop forming part 12 having its side 13 of less height than its other side 14. The side 14 extends above the upper end of the side 13. The upper end 15 of side 13 merges into a laterally disposed hook-shaped end terminal portion 16 which is disposed substantially at right angles to the side 13 and extends in a direction towards the inner end of the leg 6 of pawl 2. The end of side 14 is indicated at 17 and merges into an angle-shaped end terminal portion 18 which extends towards the inner portion of the leg 6 of pawl 2. The end terminal portions 16, 18 are not arranged in alignment as the end terminal portion 18 is offset inwardly with respect to the end terminal portion 16. The end terminal portions 16, 18 constitute angle-shaped resilient clamps for anchoring spring 11 in position. The clamps are disposed substantially at right angles to the upper ends of the sides of part 12.

The spring 11 is so shaped, when the latter is in controlling position relative to pawl 2 to have the side 13 therefor snugly engage one side of the bearing 7 and to have the other side 14 thereof extend away from the other side of bearing 7 and with a portion of the bottom of loop 12 bear against the lower face of bearing 7. The end terminal portion 16 of the spring 11 extends across a top edge portion 19 of the carrier 3 and further abuts against the inner face of carrier 3. The side 14 of spring 11 extends above such top edge portion 19 and the end terminal portion 18 extends across the top edge 20 of leg 9 and bears against the inner side of leg 6. The end terminal portions 16, 18 of the spring 11 are resilient and coact with the sides 13, 14 of spring 11 for frictionally clamping the spring 11 to the carrier 3 and to the leg 6 of pawl 2.

The pawl 2 is moved in a direction towards the oscillating sleeve 21 of carrier 3 against the action of the side 14 of the spring 11 whereby when pawl 2 is released the side 14 and end terminal portion 18 of spring 11 will return pawl 2 to its normal position, such as shown in Figure 2.

What I claim is:—

1. A controlling spring for the feed pawls of a battery feed for looms, said spring being formed from a single length of spring wire, said wire being bent to form an upstanding resilient open loop portion having a closed bottom and a pair of sides, one of said sides being of greater height than the other, said wire being bent to form an angle-shaped resilient clamp at and extended substantially at right angles to the upper end of that loop portion side of smallest length for anchoring the latter, and said wire being bent to form an angle-shaped resilient clamp at and extended substantially at right angles to the upper end of that loop portion side of greatest length for anchoring the latter, the clamp at the upper end of the loop side of greater length being arranged above said other clamp.

2. In a battery feed for looms, a rotatable element, an oscillatory carrier formed with a tubular bearing transversely thereof, a pivot shaft mounted and extended from the bearing, a feed pawl including a leg fixed to one end of said shaft, an upstanding resilient open loop-like controlling element for said pawl, said element including a closed bottom and pair of sides, one of said sides being of greater length than the other, a portion of said side of smallest length and a portion of said bottom bearing against one side and bottom of said bearing, the remaining portion of the bottom of said element being extended laterally from the bottom of the bearing, the side of greatest length of said element being spaced throughout from said bearing, said element including an angle-shaped resilient clamp at and extending substantially at right angles to the upper end of that side of smallest length of said element for anchoring the latter to said carrier, and said element including an angle-shaped resilient clamp at and extending substantially at right angles to the upper end of that side of greatest length of said element for anchoring the latter to said leg.

ARTHUR W. HILTON.